(12) United States Patent
Kageyama et al.

(10) Patent No.: US 9,697,004 B2
(45) Date of Patent: Jul. 4, 2017

(54) VERY-LONG INSTRUCTION WORD (VLIW) PROCESSOR AND COMPILER FOR EXECUTING INSTRUCTIONS IN PARALLEL

(71) Applicant: Panasonic Corporation, Osaka (JP)

(72) Inventors: Takahiro Kageyama, Osaka (JP); Hideshi Nishida, Hyogo (JP); Takeshi Tanaka, Osaka (JP); Kouji Nakajima, Ibaraki (JP)

(73) Assignee: SOCIONEXT INC., Kanagawa (JP)

( * ) Notice: Subject to any disclaimer, the term of this patent is extended or adjusted under 35 U.S.C. 154(b) by 195 days.

(21) Appl. No.: 14/247,735

(22) Filed: Apr. 8, 2014

(65) Prior Publication Data

US 2014/0223142 A1    Aug. 7, 2014

Related U.S. Application Data

(60) Continuation of application No. 12/103,372, filed on Apr. 15, 2008, now Pat. No. 8,738,892, which is a (Continued)

(30) Foreign Application Priority Data

Feb. 12, 2004  (JP) .................. 2004-034660

(51) Int. Cl.
*G06F 9/45*      (2006.01)
*G06F 9/38*      (2006.01)
*G06F 9/30*      (2006.01)

(52) U.S. Cl.
CPC .......... *G06F 9/3853* (2013.01); *G06F 9/3016* (2013.01); *G06F 9/30145* (2013.01); (Continued)

(58) Field of Classification Search
CPC ..................... G06F 9/30145; G06F 9/3853
(Continued)

(56) References Cited

U.S. PATENT DOCUMENTS 5,333,280 A * 7/1994 Ishikawa ............... G06F 8/445
                                                    712/215
5,450,556 A * 9/1995 Slavenburg ......... G06F 9/30061
                                                    712/200
(Continued)

FOREIGN PATENT DOCUMENTS

| JP | 06-230969 | 8/1994 |
| JP | 10-083302 | 3/1998 |
| JP | 2004-005733 | 1/2004 |

OTHER PUBLICATIONS

Office Action mailed Feb. 7, 2007 in U.S. Appl. No. 10/949,230.
Office Action mailed Jul. 27, 2007 in U.S. Appl. No. 10/949,230.

*Primary Examiner* — Francisco Aponte
(74) *Attorney, Agent, or Firm* — Wenderoth, Lind & Ponack, L.L.P.

(57) ABSTRACT

A Very Long Instruction Word (VLIW) processor having an instruction set with a reduced size resulting in a small number of bits being necessary to specify registers. The VLIW processor includes a register file, and first through third operation units, and executes a very long instruction word. Further, the very long instruction word includes a register specifying field which specifies a least one of the registers in the register file and a plurality of instructions. The operand of each instruction includes bits src1, src2, and dst, which indicate whether or not the registers specified by the register specifying field are to be used as the source register and the destination register.

15 Claims, 15 Drawing Sheets

Related U.S. Application Data division of application No. 10/949,230, filed on Sep. 27, 2004, now Pat. No. 7,383,422.

(52) U.S. Cl.
CPC ........ G06F 9/30156 (2013.01); G06F 9/3822 (2013.01); G06F 9/3885 (2013.01)

(58) Field of Classification Search
USPC .................................. 717/140, 149; 712/24
See application file for complete search history.

(56) References Cited

U.S. PATENT DOCUMENTS

| | | | | |
|---|---|---|---|---|
| 5,530,817 A * | 6/1996 | Masubuchi | G06F 9/30032 | 712/24 |
| 5,574,939 A * | 11/1996 | Keckler | G06F 9/30032 | 712/200 |
| 5,600,810 A * | 2/1997 | Ohkami | G06F 9/3853 | 712/226 |
| 5,761,470 A * | 6/1998 | Yoshida | G06F 9/30145 | 712/208 |
| 5,805,850 A * | 9/1998 | Luick | G06F 9/30061 | 712/215 |
| 5,819,058 A | 10/1998 | Miller | | |
| 5,826,054 A * | 10/1998 | Jacobs | G06F 9/30072 | 708/402 |
| 5,951,674 A * | 9/1999 | Moreno | G06F 8/445 | 712/200 |
| 5,974,537 A * | 10/1999 | Mehra | G06F 9/30072 | 712/215 |
| 5,983,336 A * | 11/1999 | Sakhin | G06F 9/30072 | 712/1 |
| 6,002,880 A | 12/1999 | Slavenburg | | |
| 6,023,757 A * | 2/2000 | Nishimoto | G06F 9/30181 | 712/209 |
| 6,076,154 A * | 6/2000 | Van Eijndhoven | G06F 9/30149 | 712/206 |
| 6,115,806 A * | 9/2000 | Yoshida | G06F 9/30145 | 712/208 |
| 6,122,722 A | 9/2000 | Slavenburg | | |
| 6,195,740 B1 * | 2/2001 | Heishi | G06F 9/30156 | 711/167 |
| 6,360,312 B1 * | 3/2002 | Kawaguchi | G06F 9/3001 | 712/210 |
| 6,366,999 B1 * | 4/2002 | Drabenstott | G06F 9/30036 | 712/11 |
| 6,367,067 B1 * | 4/2002 | Odani | G06F 8/445 | 712/24 |
| 6,401,190 B1 * | 6/2002 | Nishioka | G06F 9/30036 | 712/24 |
| 6,446,190 B1 * | 9/2002 | Barry | G06F 9/30043 | 711/214 |
| 6,457,173 B1 * | 9/2002 | Gupta | G06F 9/30156 | 712/E9.028 |
| 6,704,857 B2 * | 3/2004 | Barry | G06F 9/30149 | 710/22 |
| 6,834,336 B2 * | 12/2004 | Takayama | G06F 9/30145 | 712/210 |
| 6,886,091 B1 * | 4/2005 | Vissers | G06F 9/30032 | 712/215 |
| 6,889,242 B1 * | 5/2005 | Sijstermans | G06F 7/49947 | 708/497 |
| 7,024,540 B2 * | 4/2006 | Barry | G06F 9/30003 | 712/200 |
| 7,076,638 B2 * | 7/2006 | Heishi | G06F 9/30072 | 712/214 |
| 7,370,136 B2 * | 5/2008 | Dash | G06F 9/325 | 711/4 |
| 7,395,532 B2 * | 7/2008 | Borneo | G06F 9/3853 | 712/215 |
| 7,401,329 B2 * | 7/2008 | De Rijck | G06F 8/456 | 717/151 |
| 7,533,243 B2 * | 5/2009 | Takayama | G06F 9/30145 | 712/24 |
| RE41,012 E * | 11/2009 | Barry | G06F 9/30098 | 711/214 |
| 7,739,481 B1 * | 6/2010 | VanCourt | G06F 17/5054 | 712/15 |
| 2002/0120923 A1 * | 8/2002 | Granston | G06F 8/452 | 717/160 |
| 2003/0131204 A1 * | 7/2003 | Lin | G06F 9/526 | 711/152 |
| 2004/0030860 A1 * | 2/2004 | Wang | G06F 9/30072 | 712/24 |
| 2004/0075747 A1 * | 4/2004 | Silverbrook | B41J 2/14314 | 348/207.99 |

* cited by examiner

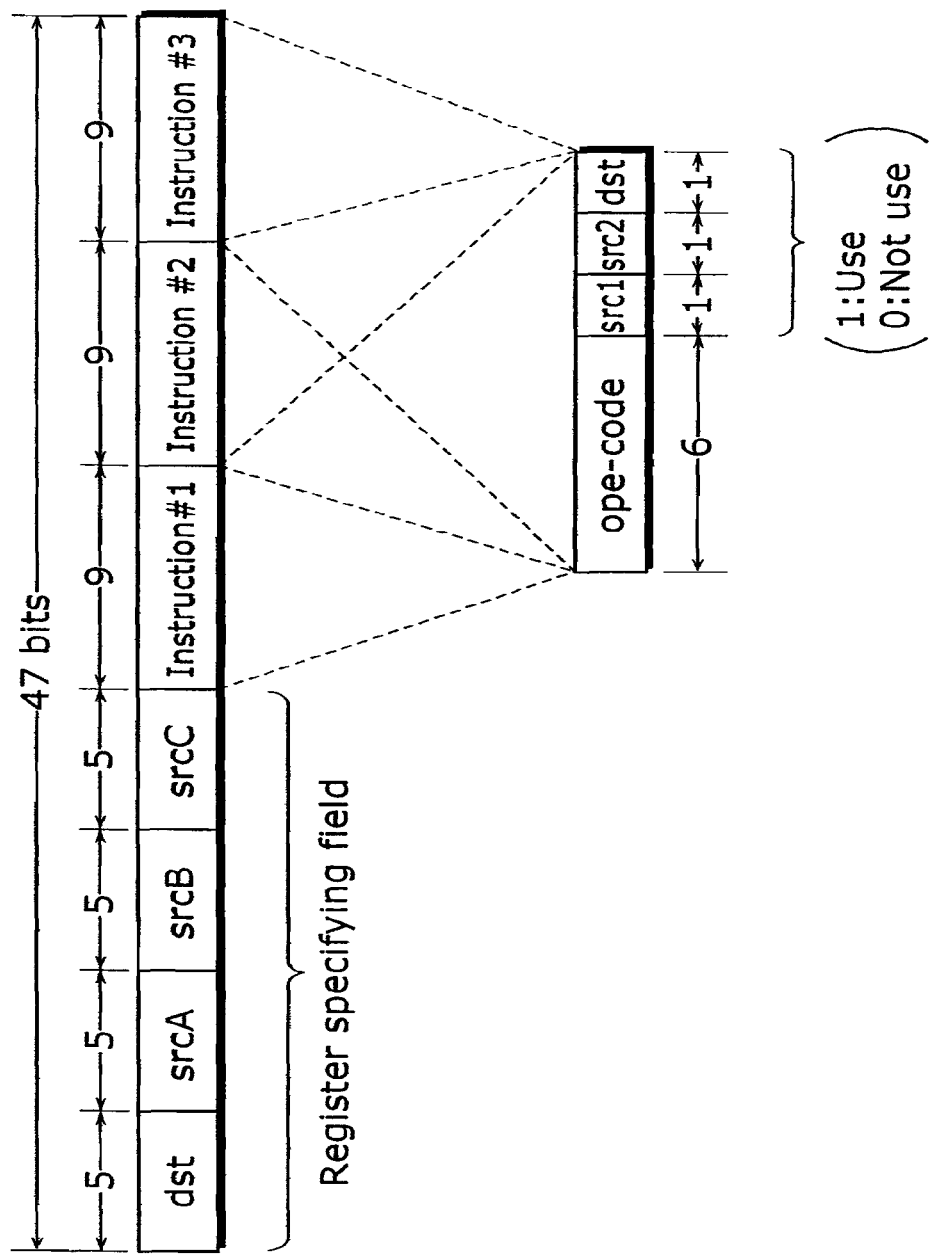

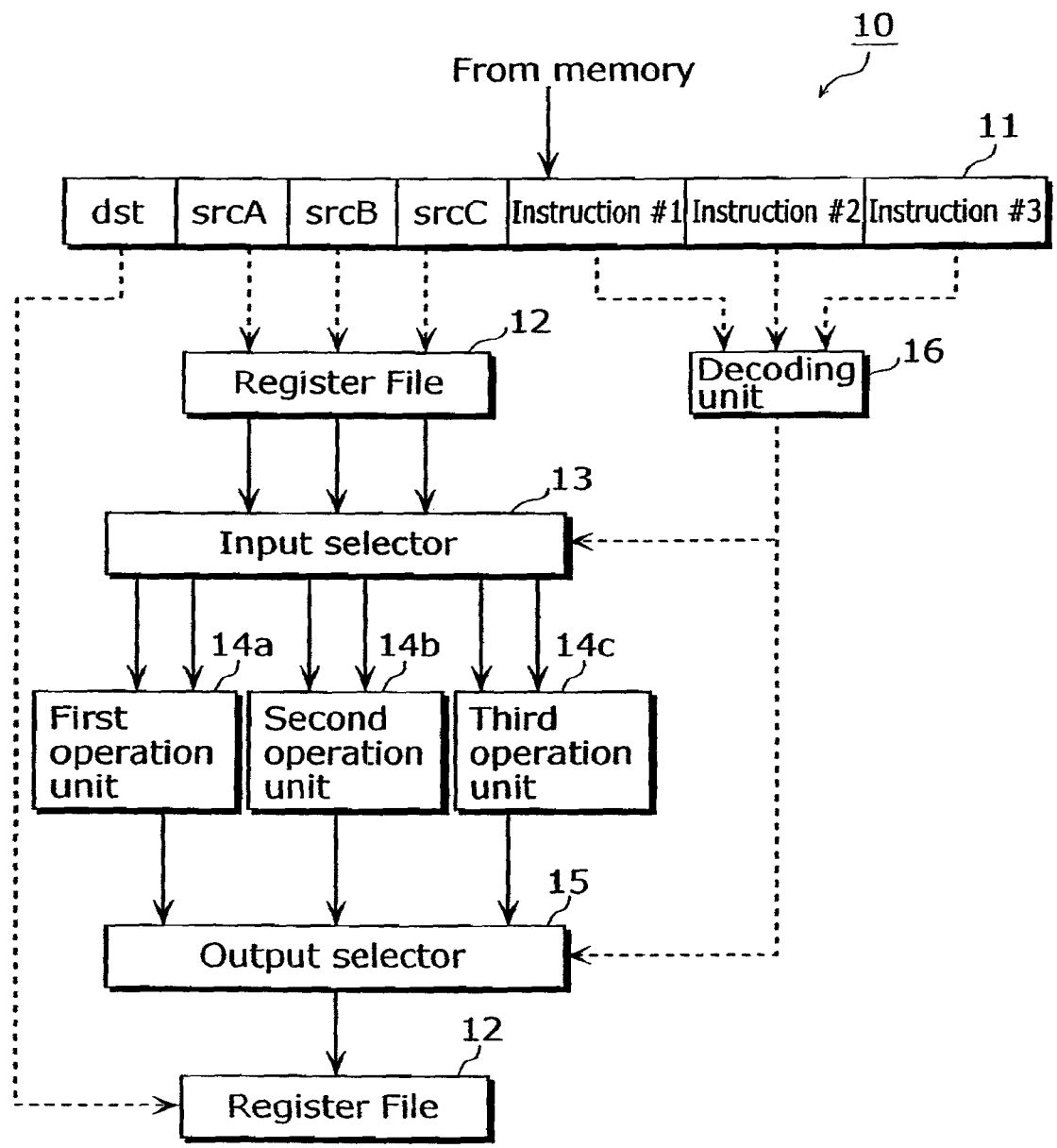

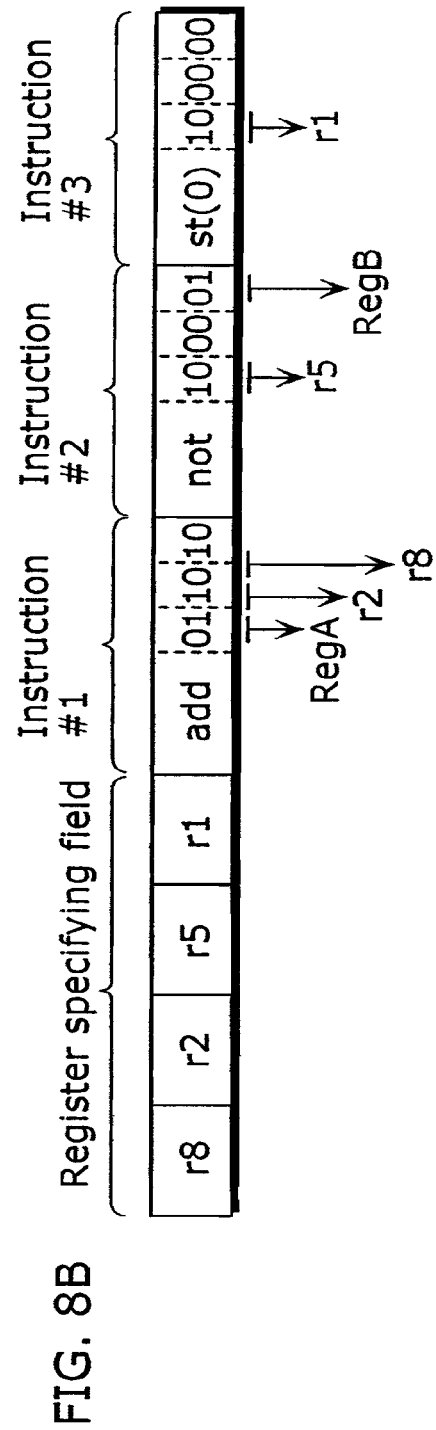

```
add   r3, r0, r2
add   r8, r3, r2
not   r9, r5
st    (0), r1
st    (0), r9
```

FIG. 9A

```
add   RegA, r0, r2    //Instruction #1
add   r8, RegA, r2
not   RegB, r5        //Instruction #2
st    (0), r1
st    (0), RegB       //Instruction #3
```

FIG. 9B

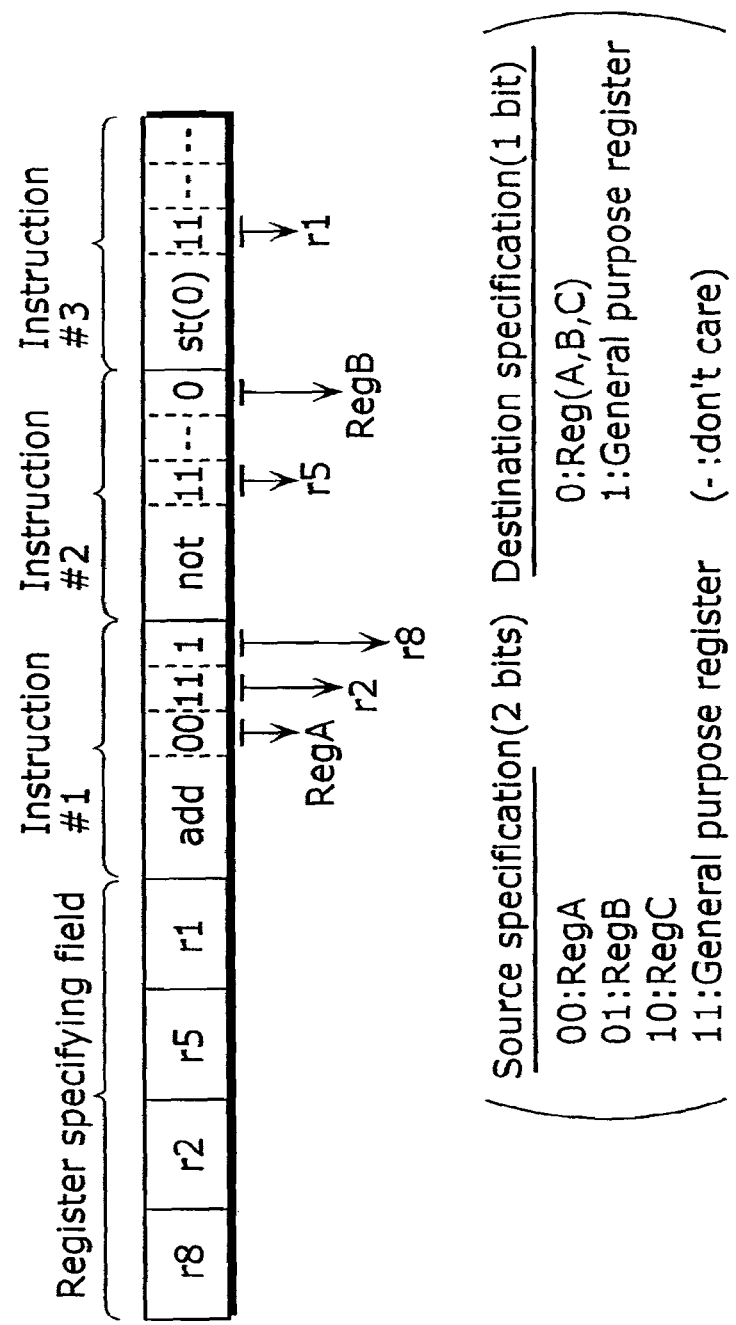

VERY-LONG INSTRUCTION WORD (VLIW) PROCESSOR AND COMPILER FOR EXECUTING INSTRUCTIONS IN PARALLEL

BACKGROUND OF THE INVENTION (1) Field of the Invention

The present invention relates to a processor and a compiler therefor, in particular, to a very-long instruction word (VLIW) processor and the like which simultaneously execute a plurality of instructions.

(2) Description of the Related Art

Conventionally various kinds of VLIW processors have been suggested, said VLIW processors comprising a plurality of executing units and executing a plurality of instructions included in a very long instruction word in each clock cycle (for example, refer to Japanese Laid-Open Patent publication No. 2004-005733).

FIG. 15A is a diagram showing an example of an instruction format of a very long instruction word which a conventional VLIW processor executes. Here, a very long instruction word is shown, said word including three instruction fields where the three instructions #1-#3 which can be executed in parallel are placed. Each instruction field has, in the case of a register operation instruction, an operational code which indicates the kind of the operation and an operand which indicates the subject of the operation (for example, a register specifying area operable to specify two source registers src1 and src2 and one destination register dst).

FIG. 15B is a diagram showing an example of an architecture (here, an architecture focusing on the input/output of the register) of the conventional VLIW processor which executes the very long instruction word as described above. Here, the architecture which includes a register file and three operation units is shown.

According to the conventional VLIW processor described above, for example, register operation instructions are simultaneously executed up to the maximum of three, and a faster processing has been developed, said register operation instructions calculating the values stored in two registers and storing the result in one register.

However, as shown in FIG. 15A, the very long instruction word of the conventional VLIW processor has register specifying areas up to the maximum of three (src1, src2 and dst) for each instruction field. Thus, there is a problem that the total number of bits of the register specifying area(s) which is (are) included in one very long instruction word becomes very large.

For example, a VLIW processor which comprises a register file including 32 registers requires 5 bits to specify one register. Thereby, the instruction format as shown in FIG. 15A requires the maximum of 15 bits of register specifying areas for each instruction field, that is, the maximum of 45 bits of register specifying areas for the whole very long instruction word. As a result, the circuit size related to the instruction path of the VLIW processor becomes large.

Moreover, according to the instruction format as shown in FIG. 15A, the number of registers simultaneously connected to the input ports of the operation units is 6 at the maximum. Therefore, as shown in FIG. 15B, 6 output ports are necessary for the register file. In this point, as well, there is a problem that the circuit size becomes large.

SUMMARY OF THE INVENTION

The object of the present invention, in view of the problems described above, is to provide a VLIW processor and the like which execute a reduced instruction set and require a small number of bits to specify a register.

In order to achieve such objects as described above, the processor according to the present invention comprises a plurality of registers and a plurality of operation units, and executes a very long instruction word, wherein the very long instruction word includes a register specifying field which specifies at least one of said plurality of registers, a plurality of instructions which specify operations using said operation units, and register allocation information which indicates a corresponding relationship between a register specified by said register specifying field and an instruction which uses the register. The processor also includes an output port which outputs a value in the register specified by said register specifying field, and an input selection control unit operable to execute selection and control so that the value output from said output port is input into said operation unit according to the corresponding relationship indicated by said register allocation information. In other words, for a source register, standardization of operand specification for each instruction included in a very long instruction word is examined.

The processor may further includes an input port which stores a value in the register specified by said register specifying field, and an output selection control unit operable to execute selection and control so that the operation result obtained by said operation unit is stored in the register, via said input port, according to the corresponding relationship indicated by said register allocation information. In other words, for a destination register, as well, standardization of operand specification for each instruction included in a very long instruction word may be examined.

Here, the register allocation information may be separately arranged as register operands in the plurality of instructions, and the register operand in each instruction may indicate whether or not the register specified by said register specifying field is used as a source register and a destination register of the instruction.

Thus, the register specifying field, which collectively specifies registers used by each instruction, is placed in the very long instruction word. Further, short information, indicating whether or not the register specified by the register specifying field is to be used, is placed in each instruction. Therefore, the size of the very long instruction word becomes compact.

Also, the number of registers which can be used by one very long instruction word is limited to the number of registers which can be specified by the register specifying field. For example, by setting a limitation that the maximum of three source registers and one destination register can be used, only a small number of output ports and input ports are necessary to be set in the register file.

The register allocation information may be arranged in the consecutive bits position of said very long instruction word, and may include information which specifies, from the plurality of instructions, the instruction which uses the register specified by said register specifying field. In other words, the instruction format which collectively arranges information about the operand of each instruction in one part of the very long instruction word may be used.

In addition, the register specifying field may specify a plurality of registers. And, the register allocation information may allocate the plurality of registers specified by the register specifying field to the plurality of instructions according to a predetermined order. For example, said register specifying field may include a plurality of register units which specify a plurality of registers. And, the register allocation information may allocate the registers, without overlapping, to the instructions according to the arrangement order of the plurality of register units in said very long instruction word and the arrangement order of the plurality of instructions. In other words, registers may be implicitly allocated prioritizing the arrangement order of the register specifying field and the arrangement order of the instruction field.

Moreover, the processor may further comprise temporary registers which hold operation results of said operation units, wherein at least one of said register specifying field and said register allocation information specifies at least one of said plurality of registers and said temporary registers. In other words, not only the general purpose register, but also the specific register for temporarily holding the operation result may be a subject for the operand of each instruction.

Here, the processor may comprise a plurality of temporary registers which correspond with each of said plurality of operation units. The temporary registers may be registers, between pipe line stages, which hold the new operation results each time said corresponding operation units generate new operation results. And, the processor may comprise temporary registers which selectively hold operation results of two or more operation units among said plurality of operation units. In other words, the temporary registers may be specific registers for each operation unit, registers between the pipe line stages, and common registers that are shared by a plurality of operation units.

Also, in order to achieve such objects as described above, the compiler according to the present invention targets a processor comprising a plurality of registers and a plurality of operation units, which converts an instruction sequence into a sequence of a very long instruction word. The compiler includes an instruction group classifying step of classifying said instruction sequence into instruction groups, including a plurality of instructions which can be executed in parallel, includes a format conversion step of converting each of the classified instruction groups into a very long instruction word format including a register specifying field which specifies a register to be used by the instruction group, a plurality of instruction codes which specify said plurality of instructions and register allocation information which indicates a corresponding relationship between the register specified by said register specifying field and the instruction which uses the register, and includes a machine language instruction conversion step of converting each of the instruction groups which have been converted into the very long instruction format into a corresponding machine language. In other words, the compiler comprises a characteristic step of converting a very long instruction word of a regular format into a specific format for the processor of the present invention.

Here, said instruction group classifying step may include a grouping step of generating an instruction group, considering the number of said operation units, but not the number of registers which can be specified by said register specifying field, a restriction judgment step of judging whether or not the number of registers used by the generated instruction group exceeds the number of registers which can be specified by said register specifying field, and an instruction division step of dividing the instruction group into instruction groups which use the number of registers that can be specified by said register specifying field, in the case where the number of registers used by the generated instruction group exceeds the number of registers which can be specified by said register specifying field. In other words, the instruction group is generated without considering the register restriction, and the instruction group which violates the register restriction is divided.

In addition, the processor further comprises temporary registers which hold operation results of said operation units. And, the register specifying field specifies at least one of said plurality of registers and said temporary registers. Here, the compiler may further comprise a general purpose register allocation step of allocating only said plurality of registers, among said plurality of registers and said temporary registers, to said instructions, a replacement judging step of judging, for the instructions to which said registers have been allocated, whether or not operands can be replaced with said temporary registers, and a replacement step of replacing the operands of the instructions which have been judged as replaceable with said temporary registers. Thus, the compiler which generates a very long instruction word of a characteristic instruction format that has the common register specifying field including not only the general purpose registers, but also the temporary registers can be realized.

According to the present invention, the very long instruction word includes the register specifying field which collectively specifies the registers that are used by each instruction included in the very long instruction word. Further, as the operand of each instruction included in the very long instruction word, only short information concerning the use of the registers that are specified by the register specifying field is arranged. Therefore, the size of the very long instruction word is reduced. Thus, the bus width to the instruction memory can be reduced, or the number of accesses to the instruction memory can be reduced. Thereby, execution can be improved due to the improved bus traffic to the instruction memory. Also, power consumption by the instruction memory access can be reduced. In other words, according to the processor of the present invention, the circuit size concerning fetching, holding, decoding and the like of the very long instruction word can be small.

Furthermore, the total number of registers used by the very long instruction word is limited to the number of registers that are specified by the register specifying field. Thus, by setting the number of specified registers to be small, the number of output ports and input ports to be set in the register file can be small. Accordingly, the circuit size of the processor can be small.

As described above, according to the present invention, the VLIW processor of high execution which executes, in parallel, a plurality of operations with a small circuit size can be realized. In particular, the VLIW processor as described above has an extremely high practical value as a processor to be incorporated in an apparatus.

FURTHER INFORMATION ABOUT TECHNICAL BACKGROUND TO THIS APPLICATION

The disclosure of Japanese Patent Application No. 2004-034660 filed on Feb. 12, 2004 including specification, diagrams and claims is incorporated herein by reference in its entirety.

BRIEF DESCRIPTION OF THE DIAGRAMS

These and other objects, advantages and features of the invention will become apparent from the following description thereof taken in conjunction with the accompanying diagrams that illustrate a specific embodiment of the invention. In the Diagrams:

FIG. 1 is a diagram showing an instruction format of a very long instruction word which a VLIW processor executes, according to the first embodiment;

FIG. 2 is a block diagram showing a hardware structure of the VLIW processor;

FIG. 8A shows an example of a very long instruction word;

FIG. 8B is a diagram showing a bit pattern (or a meaning) of the very long instruction word;

FIG. 9A shows a program list in the case where temporary registers are not used;

FIG. 9B shows a program list of the same content in the case where the temporary registers are used;

FIG. 14 is a diagram showing other examples of the instruction format capable of specifying temporary registers;

DESCRIPTION OF THE PREFERRED EMBODIMENT(S)

First Embodiment

Figures 3A, 3B:
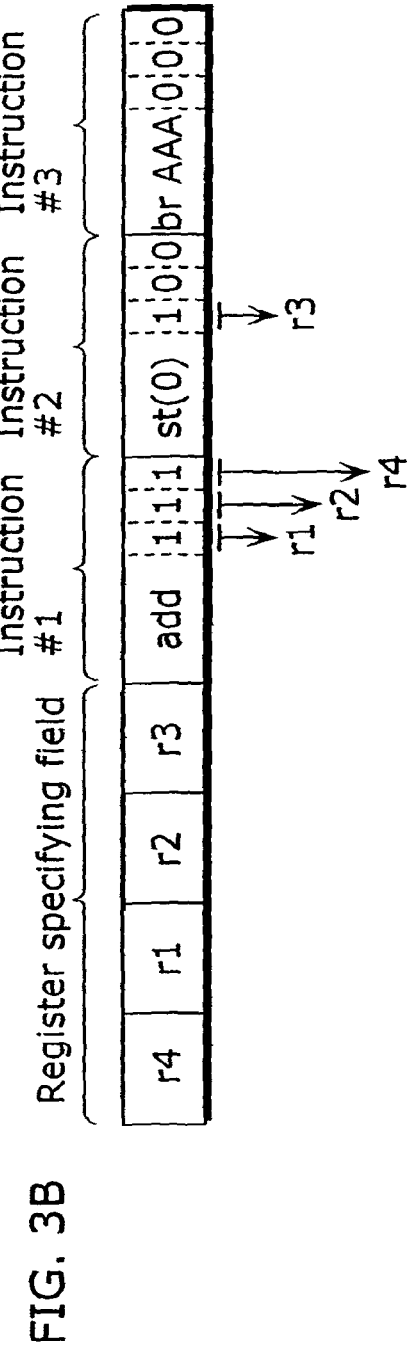
FIG. 3A shows an example of a very long instruction word.
FIG. 3B is a diagram showing a bit pattern (or a meaning) of the very long instruction word.

FIG. 1 is a diagram showing an instruction format of a very long instruction word which a VLIW processor executes according to the first embodiment. As shown in FIG. 1, this very long instruction word is 47 bits long, and includes one register specifying field and three instruction fields.

The register specifying field is a common field which specifies the register used in the three instruction fields, and includes four register specifying areas (one destination register dst and a bit field which specifies three source registers srcA-srcC). Each of the register specifying areas dst and srcA-srcC has 5 bits for specifying one of 32 general purpose registers (register files) included in the VLIW processor.

The three instruction fields (the first through the third instruction fields) arrange three instructions (the instructions #1-#3) which can be executed in parallel. In the case of a register operation instruction, an operational code of 6 bits and an operand of 3 bits are placed in each instruction field.

The operand of 3 bits indicates whether or not the register specified by the register specifying field of the very long instruction word is to be used. Specifically, the first bit src1 of the operand indicates whether the source register (one of the srcA-srcC) specified by the register specifying field is to be used as the first source register of the instruction ("1") or not ("0"). The second bit src1 indicates whether the source register (one of the srcA-srcC) specified by the register specifying field is to be used as the second source register of the instruction ("1") or not ("0"). And, the third bit dst indicates whether the destination register dst specified by the register specifying field is to be used as the destination register of the instruction ("1") or not ("0").

Here, the following rules exist for the specific allocation of the registers used by each instruction.

(1) The four registers (dst and srcA-srcC) specified by the register specifying field are used by one of the three instructions included in the very long instruction word, and they are not used by two or more instructions.

(2) The three source registers srcA-srcC specified by the register specifying field are used by each instruction, from the one with the highest priority, in the order of srcA, srcB and srcC.

(3) The three source registers srcA-srcC specified by the register specifying field are allocated, from the one with the highest priority, in the order of the instruction #1, the instruction #2 and the instruction #3.

For example, in the case where the operands (src1, src2 and dst) of the instructions #1-#3 are respectively "100", "111" and "000", it means as following: the instruction #1 indicates the register srcA as a source; the instruction #2 indicates the registers srcB and srcC as sources and the register dst as a destination; and the instruction #3 does not indicate any registers in the operand.

FIG. 2 is a block diagram showing a hardware structure of the VLIW processor 10 according to the first embodiment. In FIG. 2 only the characteristic parts of the VLIW processor 10, that is, the components related to the register operation are shown, and general components such as the input/output port which executes a data transmission with the memory are omitted. In FIG. 2 the solid lines mainly show the data flow, and the dashed lines mainly show the control flow.

As shown in FIG. 2, the VLIW processor 10 comprises an instruction register 11, a register file 12, an input selector 13, the first-the third operation units 14a-14c, an output selector 15 and a decoding unit 16.

The instruction register 11 holds a very long instruction word fetched from the memory.

The register file 12 is a collection of 32 general purpose registers, and includes: three output ports which output, to the input selector 13, the values of the three registers specified by the source register specifying areas srcA-srcC of the register specifying field of the very long instruction word held in the instruction register 11; and one input port for storing the value outputted from the output selector 15 in one register is specified by the destination register specifying area dst of the register specifying field of the very long instruction word.

The input selector 13 outputs the three values which are respectively outputted from the register file 12 to each of the first-the third operation units 14a-14c under the control of the decoding unit 16.

The first-the third operation units 14a-14c are arithmetic and logic units (ALU) and the like. The first-the third operation units 14a-14c calculate the input values of the maximum two, and output the result to the output selector 15.

The output selector 15 outputs the output value from one operation unit selected from the first-the third operation units 14a-14c to the register file 12 (one register specified by the destination register specifying area dst of the register specifying field of the very long instruction word held in the instruction register 11).

The decoding unit 16 is a circuit which controls each component by decoding the three instructions included in the very long instruction word held in the instruction register 11. For example, the decoding unit 16 controls the input selector 13 according to the source register specifying bits src1 and src2 included in the three instructions #1-#3. At the same time, the decoding unit 16 controls the output selector 15 according to the destination register specifying bit dst. Thus, the decoding unit 16 executes a control so that the register specified by the register specifying field of the very long instruction word is used as the source of the instructions #1-#3 or the destination, according to such rules as described above.

Next, the specific operations of the VLIW processor 10 according to the first embodiment which is formed as described above will be explained.

FIG. 3A shows an example of a very long instruction word. Here, the very long instruction word which includes the three instructions #1-#3 is shown. The instruction #1 (add r4, r1, r2) is an instruction for adding the value in the register r1 and the value in the register r2, and storing the result into the register r4. The instruction #2 (st (0), r3) is an instruction for storing the value in the register r3 into the "0" address of the memory. And, the instruction #3 (br AAA) is an instruction for branching into the address AAA.

FIG. 3B is a diagram showing a bit pattern of the very long instruction word as shown in FIG. 3A. As shown in FIG. 3B, the destination register specifying area dst of the register specifying field specifies the register r4. The source register specifying areas srcA-srcC respectively specify the registers r1, r2 and r3. The instruction #1 specifies the operational code "add" and the operand "111". The instruction #2 specifies the operational code "st (0)" and the operand "100". And, the instruction #3 specifies the operational code "br AAA" and the operand "000".

The VLIW processor 10 which has fetched such very long instruction word as described above executes the following operations.

The register file 12 outputs, via three output ports, the storage values of the three registers r1, r2 and r3 to the input selector 13 based on the values of the three source register specifying areas, srcA-srcC, included in the register specifying field of the very long instruction word held in the instruction register 11. Also, a connection control is executed so that the value which is outputted from the output selector 15, based on the value in the destination specifying unit dst, is inputted into the register r4 via the input port.

On the other hand, as the operand of the instruction #1 is "111", the decoding unit 16 controls the input selector 13 so that the values of the registers r1 and r2 specified by the source register specifying areas srcA and srcB are inputted into the first operation unit 14a. At the same time, the decoding unit 16 controls the output selector 15 so that the operation result is stored in the register r4 specified by the destination register specifying area dst. Further, as the operand of the instruction #2 is "100", the decoding unit 16 controls the input selector 13 so that the value in the register r3 specified by the source register specifying area srcC is inputted into the second operation unit 14b. The VLIW processor 10 executes similar operations to a regular VLIW processor in the case where controls which are not related to the register operation (a memory transmission concerning the instruction "st", updating of the program counter concerning the instruction "br" and the like) are executed.

As a result, the following processes are executed in parallel: (i) the value in the register r1 and the value in the register r2 are added in the first operation unit 14a, and the addition result is stored into the register r4 (that is, "add r4, r1, r2" is executed); and (ii) the value in the register r3 (after passing the second operation unit 14b) is stored in the "0" address of the memory in the second operation unit 14b, and (iii) the execution control branches into the address AAA.

As described above, according to the VLIW processor 10 of the first embodiment, for a very long instruction word, a common register specifying area is placed in each instruction field, and only small information which indicates whether or not the register is to be used is arranged in each instruction field. Thus, the instruction size is made compact, and the VLIW processor 10 according to the present invention can be realized with a smaller circuit size than a conventional circuit size. Furthermore, the register file 12 of the VLIW processor 10 according to the first embodiment only includes three output ports and one input port. Thus, the complexity of the hardware can be reduced.

Figure 4:
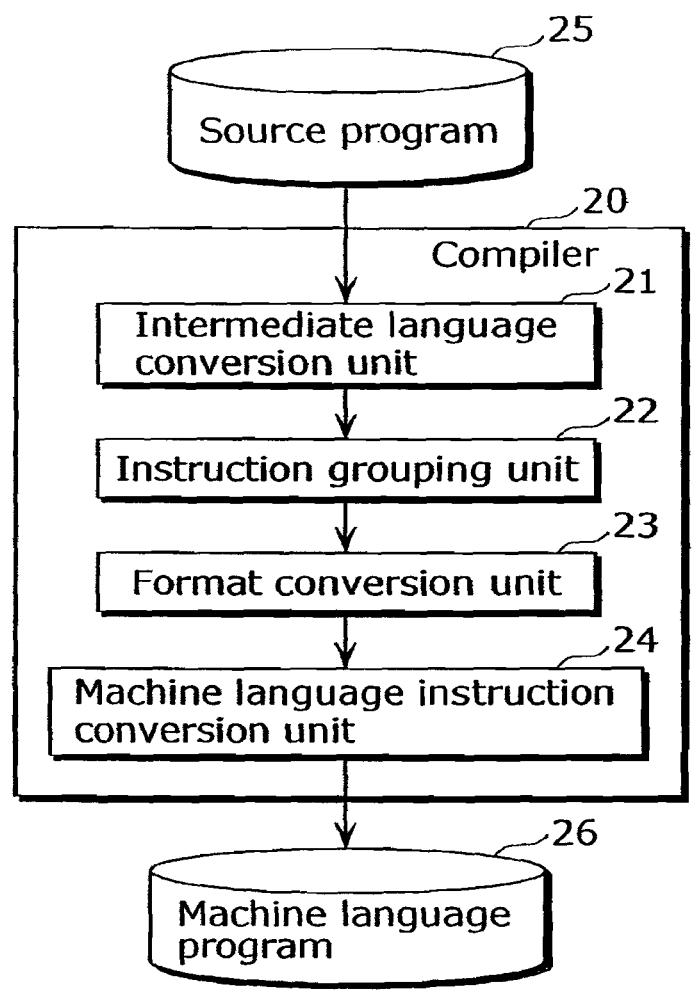
FIG. 4 is a functional block diagram showing a structure of a compiler which targets a VLIW processor according to the present invention.

FIG. 4 is a functional block diagram showing a structure of a compiler 20 which targets the VLIW processor 10 according to the present invention. The compiler 20 converts a source program 25 written in a high-level language such as a C language into a machine language program 26 for the VLIW processor 10. And, the compiler 20 comprises an intermediate language conversion unit 21, an instruction grouping unit 22, a format conversion unit 23 and a machine language instruction conversion unit 24.

The intermediate language conversion unit 21 converts the source program 25 written in a high-level language into an instruction sequence of intermediate language by a syntactic analysis and the like. Here, the intermediate language is a particular language to the compiler 20, and has a tabular form close to an assembler instruction which corresponds to the machine language instruction one-to-one. Further, the intermediate language is written in a logical tabular form before a specific resource (32 registers and the like) is allocated.

The instruction grouping unit 22 executes a parallel scheduling by grouping the instruction sequence outputted in the intermediate language conversion unit 21 per very long instruction word. Here, the grouping is executed so that three instructions are packed in one very long instruction word as much as possible within the range of the resource included in the VLIW processor. For example, the maximum of three registers are used as sources. And, three instructions are grouped in one very long instruction word within the range where the maximum of one register is used as a destination.

The format conversion unit 23 converts, per instruction group generated by the instruction grouping unit 22, a plurality of instructions included in the instruction group into the instruction format as shown in FIG. 1. In other words, the register specifying field is generated by extracting all the registers used by the plurality of instructions included in one instruction group. Further, the operand of each instruction is generated by associating the register used by each instruction with the register specifying field. For example, the instruction group which includes three instructions as shown in FIG. 3A is converted into the very long instruction word of the format as shown in FIG. 3B. Here, the resource such as a register is also allocated.

The machine language instruction conversion unit 24 generates the machine language program 26 by replacing each instruction, with the corresponding machine language instruction, which is included in the sequence of very long instruction word whose format conversion has been completed by the format conversion unit 23.

Figure 5:
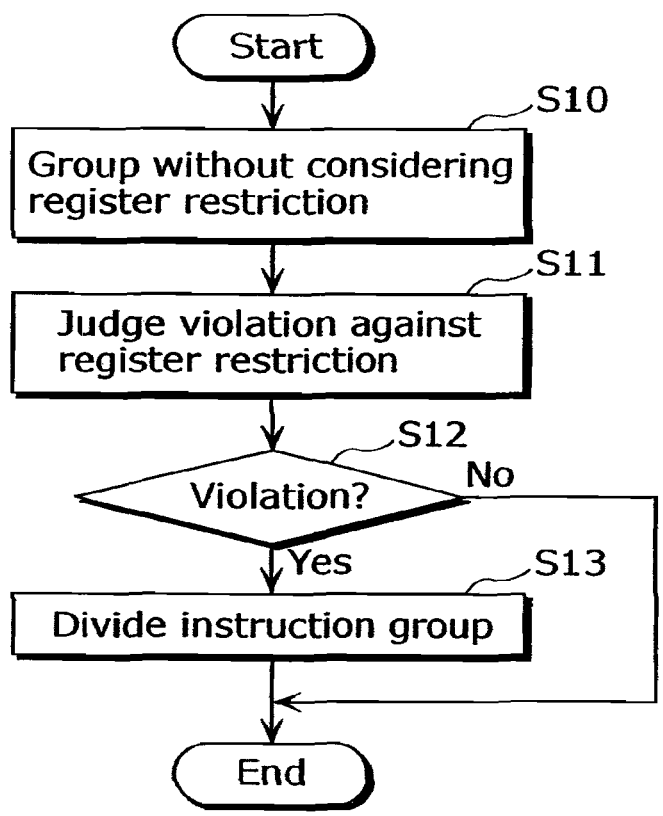
FIG. 5 is a flow chart showing characteristic operations of the compiler.

FIG. 5 is a flow chart showing characteristic operations of the compiler 20 formed as described above. Here, specific procedures of grouping by the instruction grouping unit 22, that is, grouping of the instructions which depend on the format of the very long instruction word as shown in FIG. 1 are shown.

First, the instruction grouping unit 22 executes a grouping for the instruction sequence outputted from the intermediate language conversion unit 21, without considering the register restriction (here, the maximum number of the source registers used in one very long instruction word is 3, and the maximum number of the destination registers used in one very long instruction word is 1), so that three instructions are packed in one very long instruction word (S10).

Next, the instruction grouping unit 22 judges whether the very long instruction words which have been grouped fulfill such register restriction as described above (S11).

As a result, in the case where the register restriction is not fulfilled (No in S12), the very long instruction word is divided so as to group the very long instruction words that fulfill the register restriction (S13).

For example, because a very long instruction word in which the instruction #1 which uses two source registers and one destination register, the instruction #2 which uses one source register and the instruction #3 which uses two source registers and one destination register are packed does not fulfill the register restriction, the very long instruction word is divided into, for example, the first very long instruction word which includes the instruction #1 and the instruction #2 and the second very long instruction word which includes only the instruction #2. Also, the very long instruction word which has enough room for the register restriction among the very long instruction words obtained by the division can be a subject for packing with other instructions by repeating the above mentioned step S10 and the like.

As described above, according to the compiler 20 of the first embodiment, the machine language program 26 for the VLIW processor 10 is generated from the source program 25. In other words, the sequence of very long instruction word which considers the register restriction which depends on the instruction format of the very long instruction word of the VLIW processor 10 is generated.

In the VLIW processor 10 according to the first embodiment of the present invention, each instruction does not use, overlapping, the four registers which are specified by the register specifying field of the very long instruction word (rule(1)). However, this restriction may be removed if some enlargement of the hardware size is permitted. For example, the register r1 specified by the register specifying field can be used in parallel as the source register for both the instruction #1 and the instruction #2. In such case as described above, 2 bits which specify one of the srcA-srcC can be allocated as the source register specifying area and the operand specifying unit of each instruction. The instruction size is reduced as a whole, compared to the conventional very long instruction word which required 5 bits for each instruction in order to specify the register.

For the very long instruction word according to the first embodiment, the operand of each instruction indicates whether or not the register specified by the register specifying field is to be used or not. However, in the case where the register is not to be used, the instruction map can be defined so that the operational code indicates that the register is not to be used. For example, the instruction map can be defined so that the operational code specifies the number of source registers and destination registers which the instruction uses, and the operand allocates the variable-length number of bits which correspond to such number of source registers and destination resisters as described above.

Second Embodiment

Next, a VLIW processor and a compiler according to the second embodiment will be explained. The VLIW processor according to the second embodiment executes the very long instruction word of the characteristic instruction format similar to the first embodiment. However, the VLIW processor according to the second embodiment further comprises temporary registers which temporarily hold the operation result, in addition to the register file. The VLIW processor and compiler according to the second embodiment will be explained focusing on the difference from the first embodiment as following.

Figure 6:
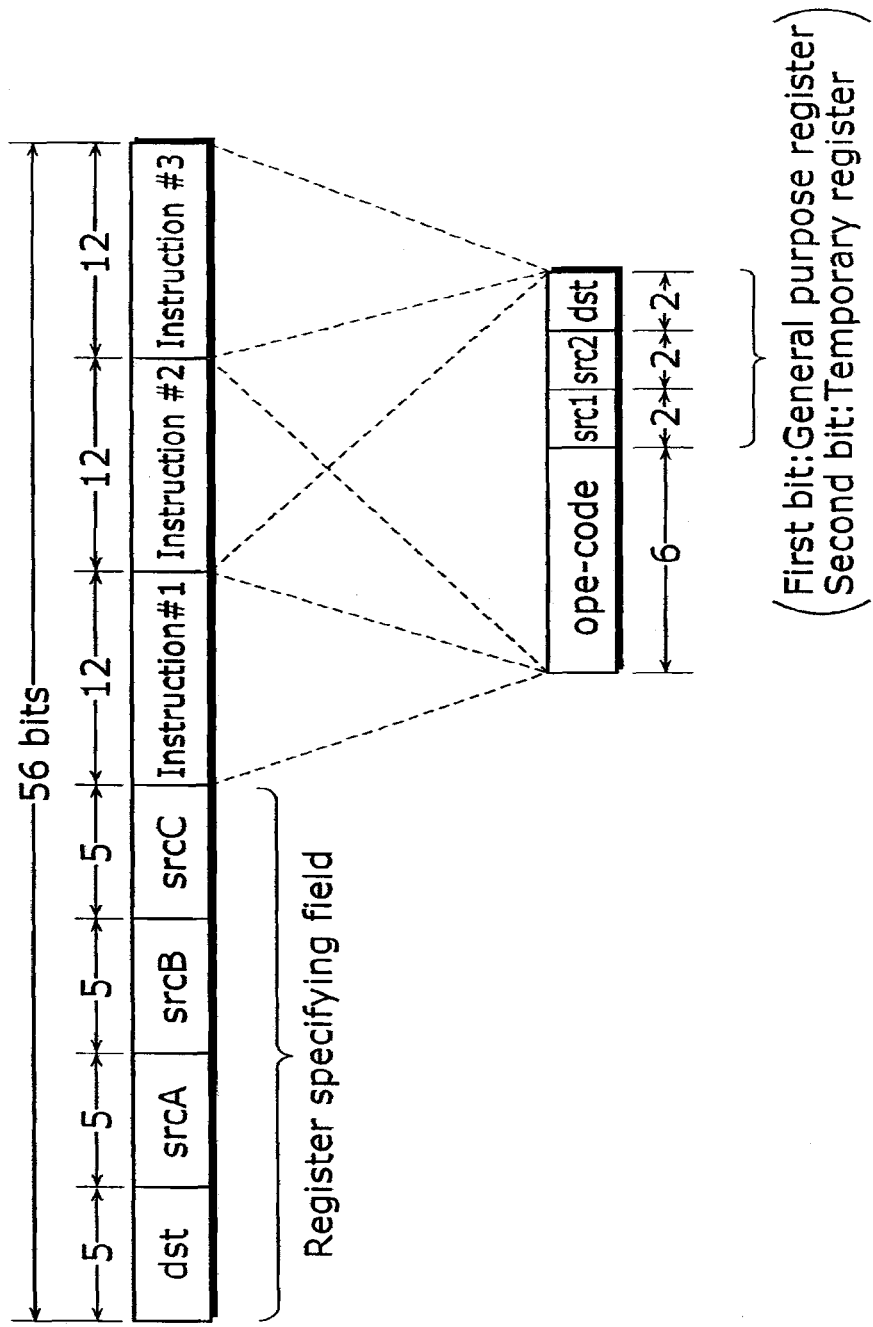
FIG. 6 is a diagram showing an instruction format of a very long instruction word which a VLIW processor executes according to the second embodiment.

FIG. 6 is a diagram showing the instruction format of the very long instruction word which the VLIW processor according to the second embodiment executes. As shown in FIG. 6, the very long instruction word is 56 bits long, and includes one register specifying field and three instruction fields.

Each of the register specifying areas dst and srcA-srcC included in the register specifying field has 5 bits in order to specify one of 32 general purpose registers included in the VLIW processor according to the second embodiment, as well as the first embodiment. However, the VLIW processor according to the second embodiment is different from the first embodiment in that the operand of each instruction field has 6 bits.

The operand of 6 bits includes the first source specifying unit src1 of 2 bits which specifies the first source register, the second source specifying unit src2 of 2 bits which specifies the second source register and the destination specifying unit dst of 2 bits which specifies the destination register.

The first bit (the upper bit of each 2 bits) of each specifying unit of 2 bits, src1, src2 and dst is similar to the operand of each instruction field according to the first embodiment, and indicates whether the register (that is, the general purpose register) specified by the register specifying field (dst and srcA-srcC) of the very long instruction word is to be used or not. On the other hand, the second bit (the lower bit of each 2 bits) indicates whether the temporary register which corresponds to the instruction field among the three temporary registers which the VLIW processor according to the second embodiment comprises is to be used ("1") or not ("0").

For example, if the source specifying unit src1 of the instruction #1 is "01", it means that the instruction #1 uses the temporary register for the first operation unit as the source register. If the destination specifying unit dst of the instruction #2 is "01", it means that the instruction #2 uses the temporary register for the second operation unit as the destination register. And, if the source specifying unit src2 of the instruction #3 is "10", it means that the instruction #3 uses, as the source register, the register specified by the register specifying field of the very long instruction word.

Figure 7:
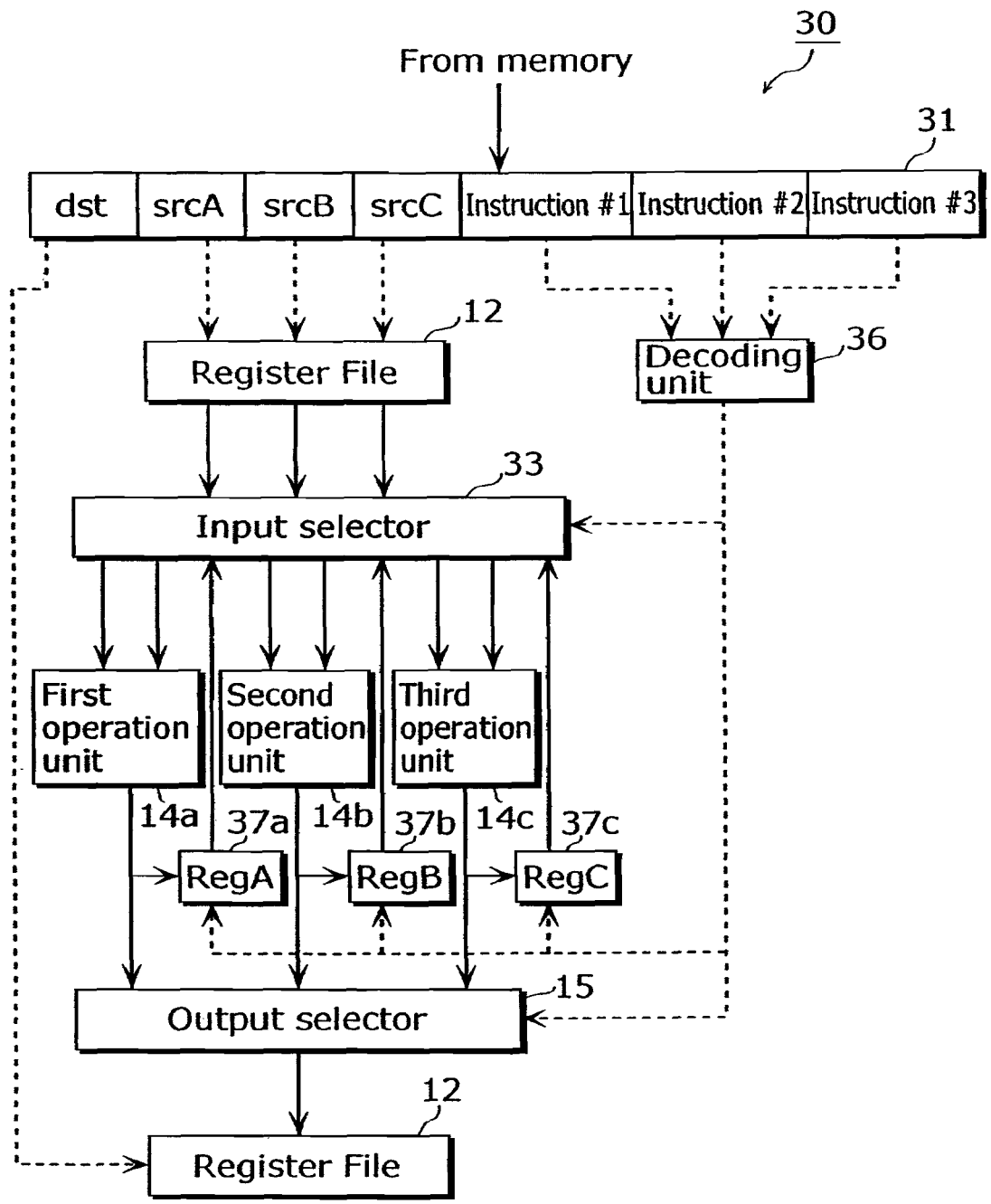
FIG. 7 is a block diagram showing a hardware structure of a VLIW processor.

FIG. 7 is a block diagram showing the hardware structure of the VLIW processor 30 according to the second embodiment. As shown in FIG. 7, the VLIW processor 30 comprises an instruction register 31, a register file 12, an input selector 33, the first through the third operation units 14a-14c, an output selector 15, a decoding unit 36 and three temporary registers 37a-37c. Here, the similar components to the first embodiment are provided with the same codes, and the explanation will be omitted.

The instruction register 31 holds the very long instruction word of 56 bits length which is fetched from the memory.

The input selector 33 sorts and outputs, to one of the first through the third operation units 14a-14c, the three values outputted from the register file 12 and the values outputted from the three temporary registers 37a-37c, under the control of the decoding unit 36.

The decoding unit 36 is a circuit which decodes the three instructions included in the very long instruction word held in the instruction register 31, and controls each component. For example, the decoding unit 36 controls the storage to the input selector 33 and the temporary registers 37a-37c according to the source register specifying bits src1 and scr2 included in the three instructions #1-#3. At the same time, the decoding unit 36 controls the output selector 15 according to the destination register specifying bit dst. Thereby, the decoding unit 36 executes a control so that the register specified by the register specifying field of the very long instruction word and the temporary registers 37a-37c are used as the source or destination of the instructions #1-#3 according to such rules as described above.

Each of the temporary registers 37a-37c temporarily holds each operation result generated from the first-the third operation units 14a-14c, and takes in the operation result when it receives a holding instruction from the decoding unit 36.

Next, specific operations of the VLIW processor 30 formed as described above according to the second embodiment will be explained.

FIG. 8A shows an example of a very long instruction word. Here, the very long instruction word which includes three instructions #1-#3 is shown. The instruction #1 (add r8, RegA, r2) adds the value in the temporary register 37a (RegA) and the value in the register r2, and stores the addition result in the register r8. The instruction #2 (not RegB, r5) reverses the value in the register r5, and stores the reversal result in the temporary register 37b (RegB). Further, the instruction #3 (st (0), r1) stores the value in the register r1 in the "0" address of the memory.

FIG. 8B is a diagram showing a bit pattern (or the meaning) of the very long instruction word as shown in FIG. 8A. As shown in FIG. 8B, the destination register specifying area dst of the register specifying field indicates the register r8. Each of the source register specifying areas srcA-srcC indicates registers r2, r5 and r1. The instruction #1 indicates the operational code "add" and the operand "011010". The instruction #2 indicates the operational code "not" and the operand "100001". And, the instruction #3 indicates the operational code "st (0)" and the operand "100000".

The VLIW processor 30 which has fetched such very long instruction word as described above has the following operations.

Based on the values in the three source register specifying areas srcA-srcC included in the register specifying field of the very long instruction word held in the instruction register 31, the register file 12 outputs, via three output ports, the storage values of the three registers r2, r5 and r1 to the input selector 33. Also, the connection control is executed so that the value outputted from the output selector 15 is inputted into the register r8, via the input port, based on the value in the destination specifying unit dst.

On the other hand, as the operand of the instruction #1 is "011010", the decoding unit 36 controls the input selector 33 so that the value in the temporary register 37a and the value in the register r2 specified by the source register specifying area srcA are inputted into the first operation unit 14a. At the same time, the decoding unit 36 controls the output selector 15 so that the operation result is stored in the register r8 specified by the destination register specifying area dst. As the operand of the instruction #2 is "100001", the decoding unit 36 controls the input selector 33 so that the value in the register r5 specified by the source register specifying area srcB is inputted into the second operation unit 14b. At the same time, the decoding unit 36 controls the temporary register 37b so that the operation result is stored in the temporary register 37b. Further, as the operand of the instruction #3 is "100000", the decoding unit 36 controls the input selector 33 so that the value in the register r1 specified by the source register specifying area srcC is inputted into the third operation unit 14c.

As a result, the following processes are executed in parallel. The value in the temporary register 37a (RegA) and the value in the register r2 are added in the first operation unit 14a. The addition result is stored in the register r8 (that is, "add r8, RegA, r2" is executed). The value in the register r5 is reversed in the second operation unit 14b. The reversal result is stored in the temporary register 37b (RegB) (that is, "not RegB, r5" is executed). Further, the value in the register r1 (after passing the third operation unit 14c) is stored in the "0" address of the memory in the third operation unit 14c.

As described above, according to the VLIW processor 30 of the second embodiment, for a very long instruction word, a common register specifying area is placed in each instruction field, and only small information which indicates whether or not the general purpose register and the temporary register are to be used or not is arranged. Thus, as well as the first embodiment, the instruction size is made compact, and the VLIW processor 30 according to the present invention can be realized with a smaller circuit size than a conventional circuit size. Furthermore, the register file 12 of the VLIW processor 30 according to the second embodiment only includes three output ports and one input port. Thus, the complexity of the hardware can be reduced.

Also, the VLIW processor 30 according to the second embodiment comprises a temporary register which temporarily holds the operation result. Thus, compared to the VLIW processor according to the first embodiment which comprises only 32 general purpose registers, the register restriction becomes moderate, and the packing rate of the very long instruction word, that is, parallel rate of instructions can be improved.

FIG. 9A and FIG. 9B are diagrams for explaining the effects of the temporary registers 37a-37c which the VLIW processor 30, according to the second embodiment, comprises. FIG. 9A shows a program list in the case where the temporary registers are not used. FIG. 9B shows a program list of the same process content in the case where the temporary registers are used.

As recognized by comparing these two programs, the number of necessary general purpose registers decreases by using the temporary registers. Further, it is possible to pack the three instructions of the second through the fifth instructions into one very long instruction word (the same one as shown in FIG. 8). In other words, the three instructions of the second through the fifth instructions as shown in FIG. 9A use four source registers and two destination registers in total, and do not fulfill the register restriction (the maximum of three source registers and one destination register). However, the three instructions of the second through the fifth instructions as shown in FIG. 9B fulfill the register restriction. Thus, it is possible to integrate three instructions in one very long instruction word by allocating the temporary registers. Further, the parallel rate of the instructions can be improved.

The compiler which targets the VLIW processor 30 according to the second embodiment comprises a similar functional structure to the first embodiment. However, the instruction grouping unit of the compiler according to the second embodiment executes a grouping of the instructions considering the allocation of the temporary registers 37a-37c, in addition to the function of the first embodiment.

Figure 10:
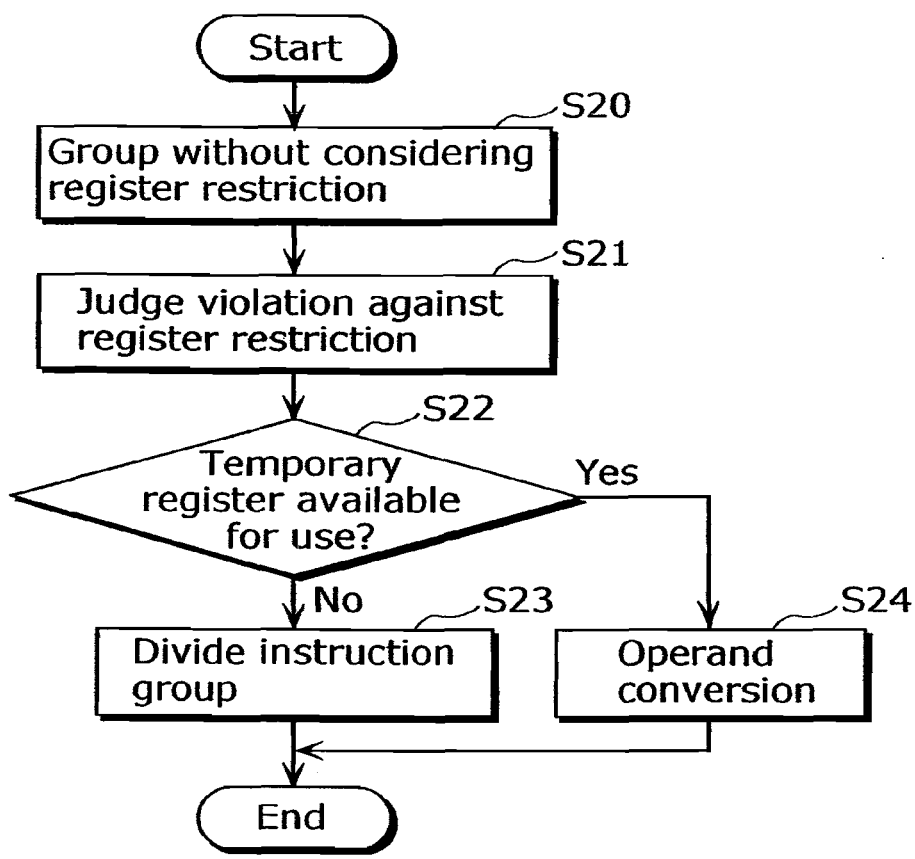
FIG. 10 is a flow chart showing the specific procedures of a grouping in consideration with the temporary registers for the instruction grouping unit of the compiler according to the second embodiment.

FIG. 10 shows specific procedures of grouping which considers the temporary registers by the instruction grouping unit of the compiler according to the second embodiment.

First, the instruction grouping unit executes a grouping of the instruction sequence outputted from the intermediate language conversion unit 21 without considering the register restriction (here, the maximum number of the source registers used in one very long instruction word is 3, and the maximum number of the destination registers is 1) so that the three instructions are packed in one very long instruction word (S20).

Next, the instruction grouping unit judges whether or not the very long instruction word which has been grouped fulfills the register restriction as described above (S21). Here, the instruction grouping unit also considers whether or not the temporary registers can be used for the register of the operand. In other words, the instruction grouping unit stores the operation result of the instruction sequence in the register. After that, if there are parts which refer to the register, the instruction grouping unit allocates the register to the temporary registers. Thus, the instruction grouping unit considers fulfilling the register restriction, as described above, as much as possible.

As a result, in the case where the register restriction is fulfilled by using the temporary registers (Yes in S22), the general purpose register is replaced with the temporary registers (S24). In the case where the register restriction is not fulfilled (No in S22), the very long instruction word is divided to make a group of very long instruction words which fulfill the register restriction (S23). Thereby, the machine language program 26, which uses as many temporary registers as possible, is generated.

As described above, according to the compiler of the second embodiment, the machine language program 26 for the VLIW processor 30 is generated from the source program 25. In other words, the sequence of a very long instruction word with a high parallel rate, which considers the register restriction which depends on the instruction format of the very long instruction word of the VLIW processor 30, and uses as many temporary registers as possible, is generated.

Figure 11:
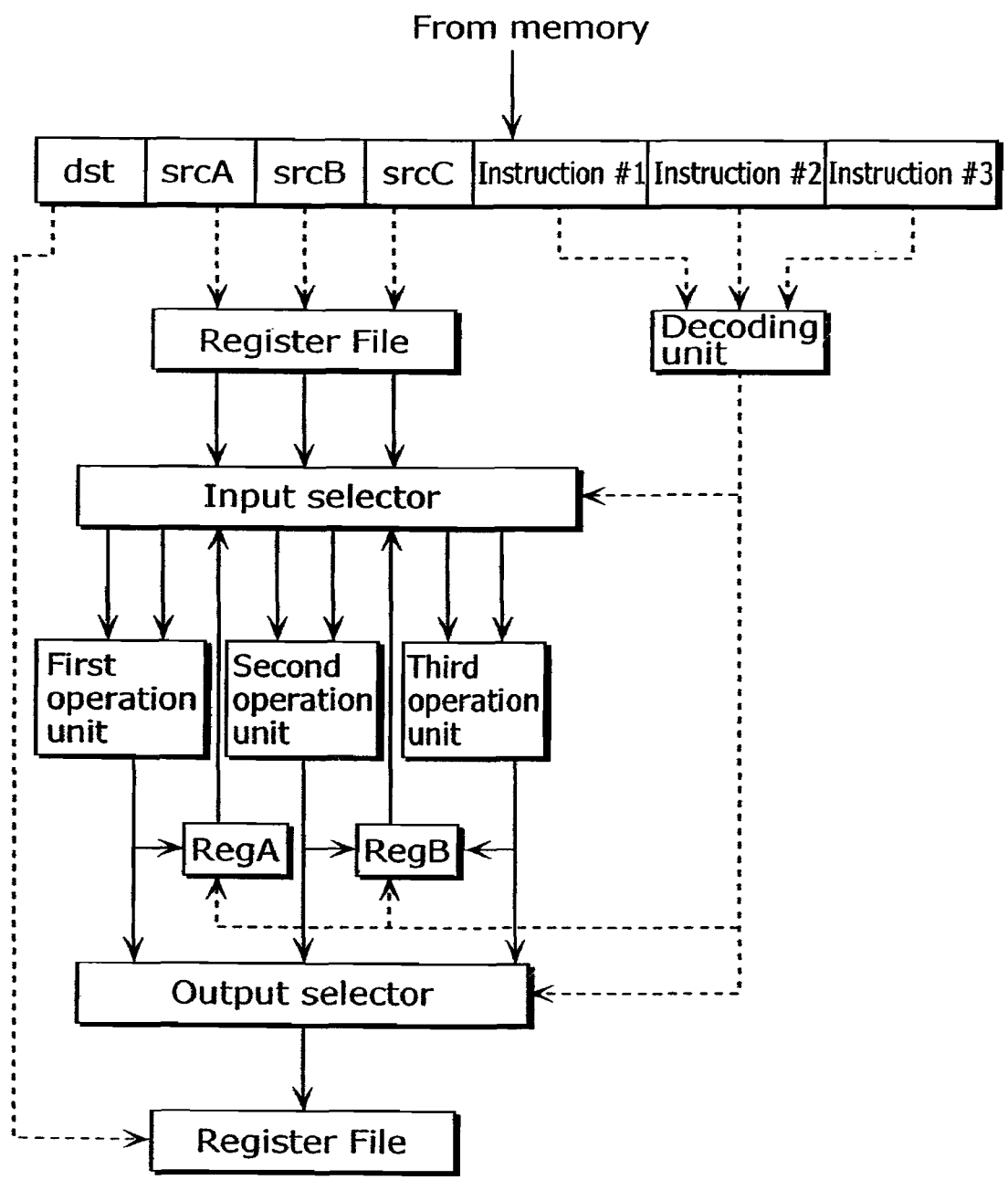
FIG. 11 is a block diagram showing a hardware structure of a VLIW processor which shares temporary registers.

In the VLIW processor 30 according to the second embodiment, one of the temporary registers 37a-37c is provided for each of the first through the third operation units 14a-14c. However, as the VLIW processor shown in FIG. 11, two or more operation units may share one temporary register. In the case as described above, the compiler may guarantee that the operation results are not simultaneously stored in the common temporary register by two or more instructions of the same very long instruction word, and the value is not destroyed by the common operation unit in the duration interval.

Figure 12:
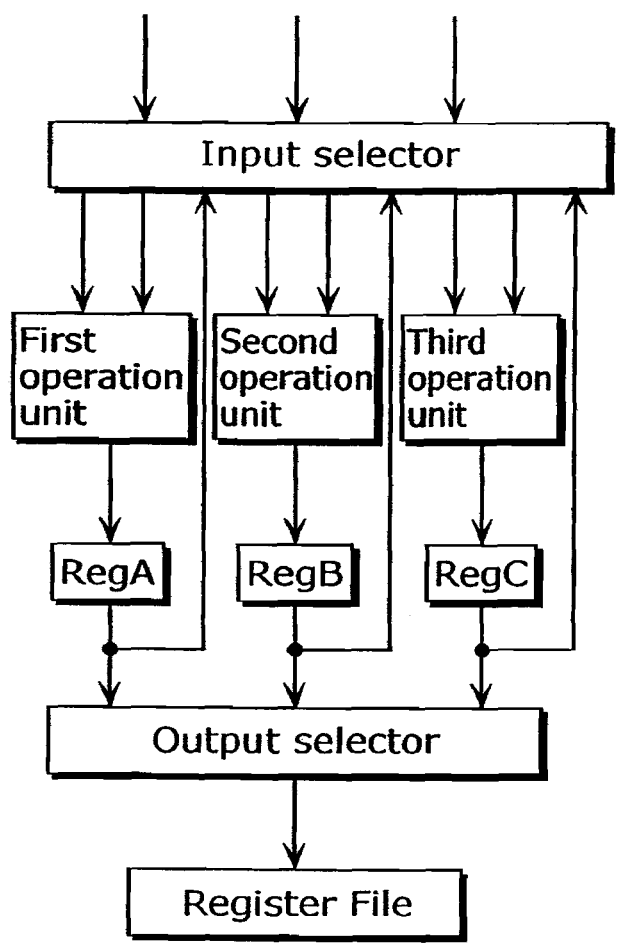
FIG. 12 is a block diagram showing a hardware structure of a VLIW processor which has registers between pipe line stages as temporary registers.

Also, according to the VLIW processor 30 of the second embodiment, it is possible to select whether or not the operation results of the first through the third operation units 14a-14c are to be stored in the temporary registers 37a-37c. However, as the circuit diagram shown in FIG. 12, a structure where the operation results are always stored in the temporary registers is also possible. In other words, registers between the pipe lines which latch operation results can be used as the temporary registers according to the second embodiment. After holding the outputted values from the operation units, such registers keep holding the values until the operation units execute new operations. During this period, such registers as described above can be treated in the same way as the temporary registers according to the second embodiment.

As described above, the VLIW processor and compiler according to the present invention are explained based on the embodiments. However, the present invention is not limited to such embodiments as described above.

For example, according to such embodiments as described above, the information about the use of the operand register (use/not use) is placed in each instruction of a very long instruction word. However, the present invention is not limited to such instruction format as described above. Further, as the instruction format shown in FIG. 13, a register allocation field, which has integrated only the information about the allocation of the operand register for each instruction, can be set in a very long instruction word.

Figure 13:
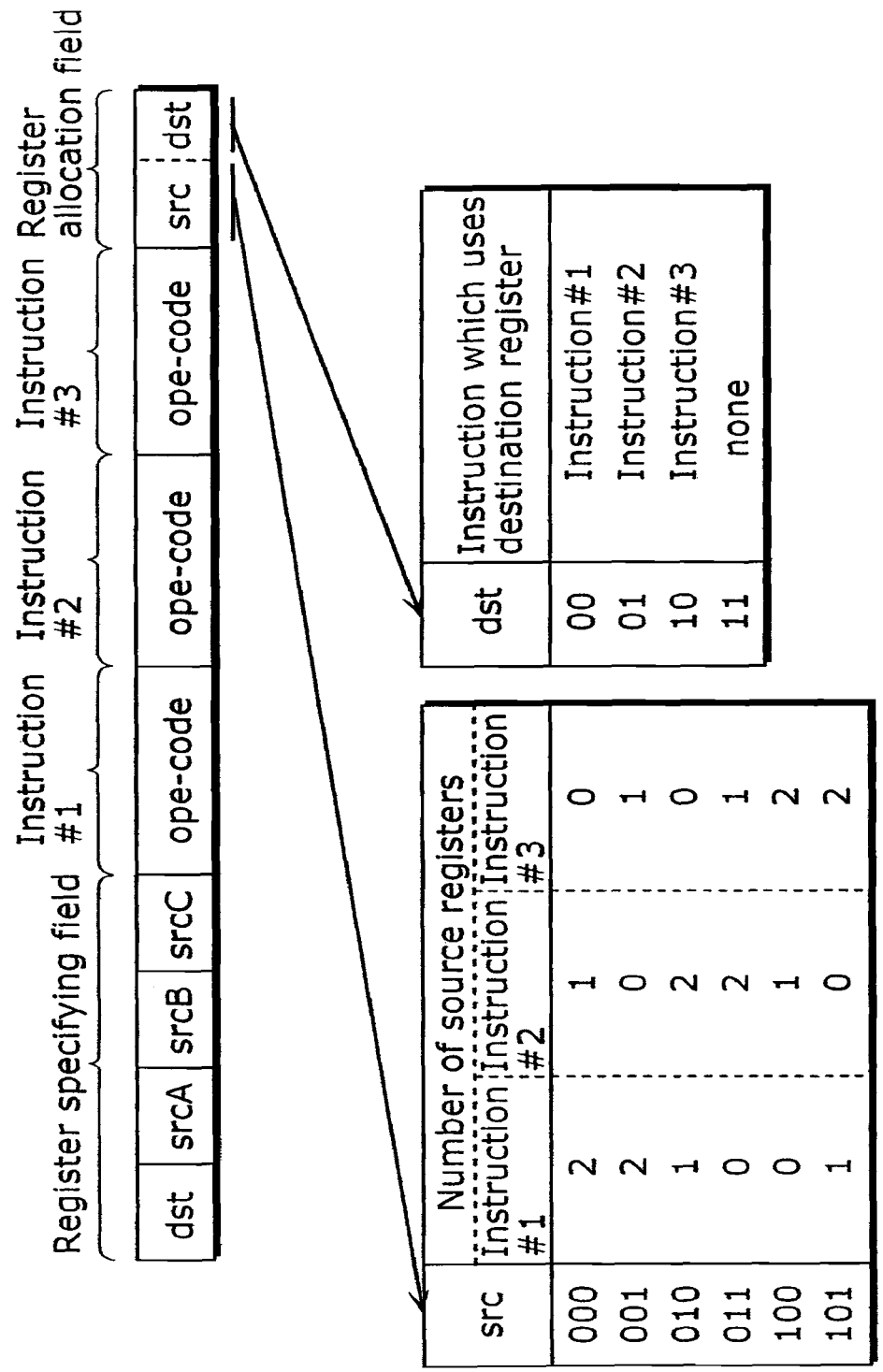
FIG. 13 is a diagram showing an example of an instruction format of a very long instruction word which has a register allocation field which has integrated information about the allocation of the operand register for each instruction.
Figure 15A:
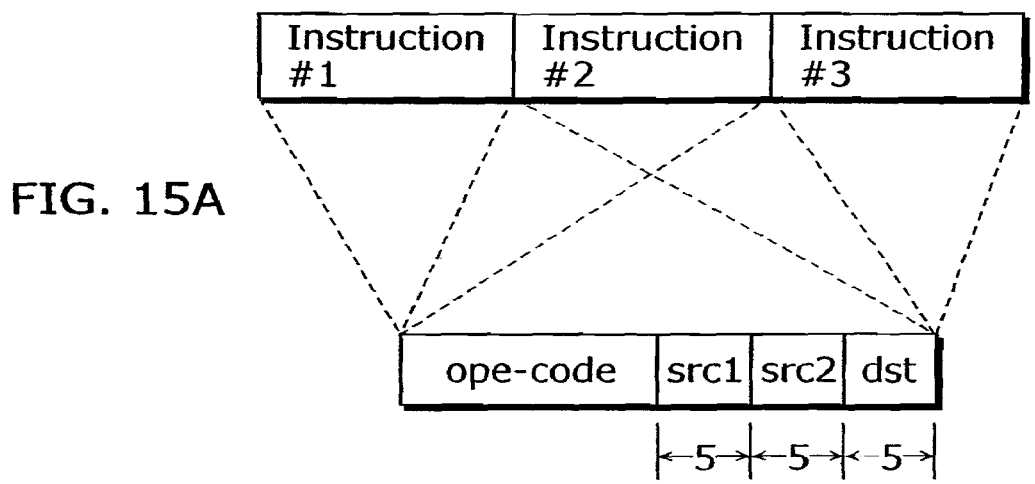
FIG. 15A is a diagram showing an example of an instruction format of a very long instruction word which the conventional VLIW processor executes.
Figure 15B:
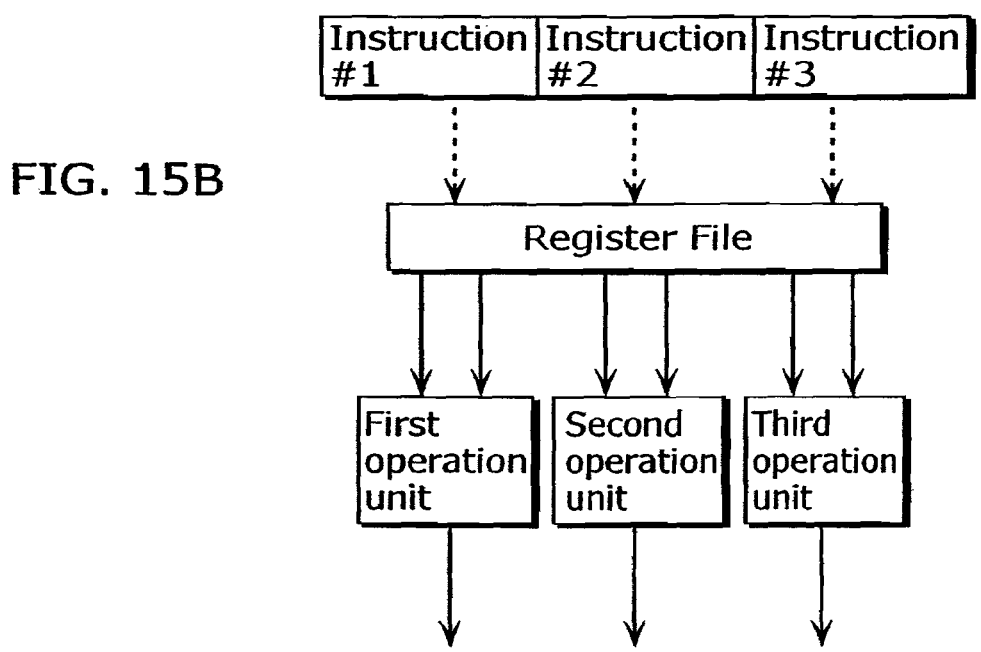
FIG. 15B is a diagram showing an example of the architecture of the conventional VLIW processor which executes the very long instruction word as described above.

The instruction format as shown in FIG. 13 is a variation example of the instruction format as shown in FIG. 1. For example, in the 5 least significant bits of a very long instruction word, a register allocation field which indicates rules for allocating the operand registers for the instructions #1-#3 is set. The register allocation field includes a source specifying unit src of 3 bits which specifies the allocation of source registers and a destination specifying unit dst of 2 bits which specifies the allocation of a destination register. The source specifying unit src, as shown in FIG. 13, indicates combinations of the number of source registers used by each of the instructions #1-#3. The destination specifying unit dst indicates the positions of the instructions which use the destination register ("the instruction #1", "the instruction #2", "the instruction #3", "none" and the like). By setting the register allocation field as indicated in the allocation rules in the very long instruction word, it is not necessary to place the information about the register operand in each instruction. Thus, as a whole, the size of the very long instruction word can be reduced.

Also, according to the second embodiment, the examples of an instruction format which uses temporary registers are shown in FIG. 6 and FIG. 8B. However, the present invention is not limited to the instruction format as described above. For example, as shown in FIG. 14, the operand for each instruction can be formed by 5 bits. FIG. 14 shows an example of another instruction format which has the same content of the instruction format as shown in FIG. 8B. Here, the operand of 5 bits includes, from the top, each source specifying unit src1 and src2 of 2 bits and a destination specifying unit dst of 1 bit. Each source specifying unit src1 and src2 of 2 bits indicates which of a general purpose register or temporary registers is to be used as a source register. Further, the destination specifying unit dst indicates which of the general purpose register or temporary register, which belongs to each operation unit, is to be used. Also, the information that it is not necessary to specify a register is included in the operational code unit. According to the instruction format as described above, by any of the instructions #1-#3, the temporary register which can be specified as a source register is not limited to the temporary register which corresponds to the position (any of the temporary registers RegA-RegC can be specified).

In addition, according to such embodiments as described above, the very long instruction word includes three instructions. However, the present invention is not limited to the parallel rate as described above, and four or more instructions can be included. The more instructions that are included in parallel, the more effects for the instruction format (reducing the instruction size) of the present invention can be obtained.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The processor according to the present invention can be utilized as a VLIW processor which executes a plurality of instructions and the like, in particular, as a processor to which a high processing execution is required with a small circuit size, for example, as a processor incorporated in an electronic appliance such as a DVD player and a cellular phone.

The invention claimed is:

1. A very long instruction word (VLIW) processor which performs a plurality of operations in parallel, the VLIW processor comprising:
   an instruction register for holding a very long instruction word; and
   a plurality of operation units,
   wherein the very long instruction word is composed of a plurality of first fields each designating an operation to be performed, and a second field partitioned into a plurality of sub-fields,
   the second field is operable to be referred to by at least two of the first fields at once,
   each of the sub-fields in the second field is operable to be correlated with any one of the first fields, and
   multiple operations defined by the plurality of first fields and the second field are performed in parallel by the plurality of operation units.

2. The VLIW processor according to claim 1, further comprising:
   an instruction decoder for decoding the very long instruction word held in the instruction register,
   wherein the instruction decoder is operable to decode a first one of the first fields, a second one of the first fields and a third one of the first fields in parallel.

3. The VLIW processor according to claim 2,
   wherein, when the instruction decoder decodes a first very long instruction word, the first one of the first fields and the second one of the first fields are decoded using a first one of the sub-fields and a second one of the sub-fields respectively,
   when the instruction decoder decodes a second very long instruction word, the second one of the first fields and the third one of the first fields are decoded using the first one of the sub-fields and the second one of the sub-fields respectively, and
   the first and second very long instruction words are different from each other.

4. The VLIW processor according to claim 1,
   wherein, when a certain one of the sub-fields in the second field is referred to by a certain one of the first fields, the certain one of the sub-fields is used to designate an operand for the operation designated by the certain one of the first fields.

5. The VLIW processor according to claim 4,
   wherein, when the instruction register holds a first very long instruction word, a first one of the sub-fields and a second one of the sub-fields in the second field are referred to by a first one of the first fields and a second one of the first fields respectively, and the first one of the sub-fields and the second one of the sub-fields are used to designate operands for the operations designated by the first one of the first fields and the second one of the first fields respectively, and
   when the instruction register holds a second very long instruction word, the first one of the sub-fields and the second one of the sub-fields in the second field are referred to by the second one of the first fields and a third one of the first fields respectively, and the first one of the sub-fields and the second one of the sub-fields are used to designate operands for the operations designated by the second one of the first fields and the third one of the first fields respectively.

6. The VLIW processor according to claim 1, further comprising:
   a register file having a plurality of registers,
   wherein a certain one of the first fields includes an operational code and an operand code, and
   a corresponding one of the operation units performs an operation specified by the operational code in the certain one of the first fields using a register in the register file which is specified by the operand code in the certain one of the first fields and a code in a certain one of the sub-fields.

7. The VLIW processor according to claim 6,
   wherein the certain one of the sub-fields is specified by the certain one of the first fields.

8. The VLIW processor according to claim 1,
   wherein the sub-fields in the second field to be correlated are designated by each of the first fields.

9. A very long instruction word (VLIW) processor which performs a plurality of operations in parallel, the VLIW processor comprising:
   an instruction register for holding a very long instruction word; and
   a plurality of operation units,
   wherein the very long instruction word is composed of a plurality of first fields each designating an operation to be performed, and a second field partitioned into a plurality of sub-fields,
   each of the first fields is decoded selectively with the sub-fields in the second field, the sub-fields to be decoded being designated by each of the first fields based on the very long instruction word held in the instruction register, and multiple operations defined by the plurality of first fields and the second field are performed in parallel by the plurality of operation units.

10. The VLIW processor according to claim 9,
wherein the sub-fields used for decoding one of the first fields is determined in accordance with the very long instruction word held in the instruction register.

11. The VLIW processor according to claim 9,
wherein, when a certain one of the first fields is decoded with using one or more of the sub-fields, the certain one of the first fields designates the one or more of the sub-fields to be used for decoding.

12. The VLIW processor according to claim 9, further comprising:

an instruction decoder for decoding the very long instruction word held in the instruction register, wherein the instruction decoder is operable to decode each of the first fields in parallel, and the decoding of each of the first fields is performed without using the sub-fields or is performed using at least one of the sub-fields in the second field selectively.

13. The VLIW processor according to claim 9,
wherein, when a certain one of the sub-fields in the second field is used for decoding a certain one of the first fields, the certain one of the sub-fields is used to designate an operand for the operation designated by the certain one of the first fields.

14. The VLIW processor according to claim 9, further comprising:

a register file having a plurality of registers, wherein a certain one of the first fields includes an operational code and an operand code, and a corresponding one of the operation units performs an operation specified by the operational code in the certain one of the first fields using a register in the register file which is selectively specified by the operand code in the certain one of the first fields or specified by the operand code in the certain one of the first fields and a code in the sub-fields.

15. The VLIW processor according to claim 14,
wherein, when a certain one of the first fields is decoded with using a certain one of the sub-fields, the register which is used for the operation is specified by the operand code in the certain one of the first fields and a code in the certain one of the sub-fields.

* * * * *